(12) United States Patent
Young et al.

(10) Patent No.: US 6,342,762 B1
(45) Date of Patent: Jan. 29, 2002

(54) AMBER VEHICLE LAMP

(75) Inventors: Paul Young, Merrimack; Mitchell Gagnon, Manchester; William H. Lynch, Derry, all of NH (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/486,555
(22) PCT Filed: Jul. 1, 1998
(86) PCT No.: PCT/US98/13693
 § 371 Date: May 26, 2000
 § 102(e) Date: May 26, 2000
(87) PCT Pub. No.: WO00/02224
 PCT Pub. Date: Jan. 13, 2000

Related U.S. Application Data
(60) Provisional application No. 60/051,740, filed on Jul. 3, 1997.

(51) Int. Cl.$^7$ .............................. H01J 61/40; H01J 5/08
(52) U.S. Cl. ........................................ 313/580; 313/112
(58) Field of Search ................................... 313/112, 110, 313/580, 315, 493, 635; 359/885, 892; 252/580; 427/106, 110, 108

(56) References Cited

U.S. PATENT DOCUMENTS 5,126,620 A 6/1992 Haraga et al. ............... 313/112
5,470,606 A * 11/1995 De Boer ..................... 427/108
5,667,888 A 9/1997 Yoshida et al. ............. 359/885

OTHER PUBLICATIONS

Patent Abstracts of Japan, vol. 1997, No. 09, Sep. 30, 1997, & JP 09 124976 A (Koito Mfg. Co Ltd;—Nippon Kako Toryo KK), May 13, 1997 *abstract*.

Patent Abstracts of Japan, vol. 013, No. 176 (E–749), Apr. 25, 1989, & JP 01 006354 A (Matsushita Electronics Corp), Jan. 10, 1989 *abstract*.

Database WPI, Derwent Publications Ltd., London, GB; AN 1985–058731, XP002174672, "lamp for color display unit" & JP 60 014749 A (Matsushita Electronics Corp), Jan. 25, 1985 *abstract*.

* cited by examiner

Primary Examiner—Michael H. Day
(74) Attorney, Agent, or Firm—Young & Thompson

(57) ABSTRACT

An amber vehicle lamp having a lamp bulb, and an amber coating including a clear silicone-polyester resin, and colorants including red iron oxide, and a yellow anthraquinone. The amber coating may further include a silane coupling agent. The amber vehicle lamp provides an amber color meeting ECE specifications, and having a coating durability of 96 percent of color at 70 percent of the rated lamp life. The colorants have a particle size of less than 0.01 microns providing a substantially clear amber colored bulb.

15 Claims, 2 Drawing Sheets

AMBER VEHICLE LAMP

CROSS REFERENCE TO RELATED APPLICATION

This is the 35 USC 371 national stage of International application PCT/US98/13693 filed on Jul. 1, 1998, which designated the United States of America.

The Applicants hereby claim the benefit of their provisional application, Ser. No. 60/051,740 filed Jul. 3, 1997 for Protective Graft Coating Composition for Glass Bulbs for Automotive Applications.

1. Technical Field

The invention relates to electric lamps and particularly to electric lamps used in vehicles. More particularly the invention is concerned with a polymer coating for a vehicle signal lamp.

2. Background Art

Amber vehicle lamp bulbs are commonly used as signal lamps in motor vehicles. Historically amber bulbs were made with a cadmium doped glass to produce the amber color. For environmental reasons, cadmium has become an unacceptable material. There is now a market need for an environmentally sound alternative. Various color coated lamps have been developed, and their initial color can be acceptable. Given the specified expected ambient operating conditions for a vehicle, the bulb surface may have a temperature ranging from −40 to 350 degrees Celsius, so durability is difficult to achieve. In fact, the color, or the adherence of the existing coatings, or both have not been particularly good over time. Elapsed time for an automotive signal lamp can appear to be relatively long, while in fact the actual "on" time can be relatively short. A signal lamp may be on for only minutes in the day of a vehicle's operation, so the apparent life of the lamp may appear to be a year or more, when in fact the lamp has only been on cumulatively for only a few tens or even several hundred hours or so. In longer use, known coatings have been found to peel, or turn into a dust that falls off the bulb. Similarly the color may fade. The lamp color then departs from the required specification. There is then a need for an amber bulb coating material that meets standard color specifications, and has a durable life.

DISCLOSURE OF THE INVENTION

A durable amber colored lamp may be formed from a lamp bulb having a coating formed from a silane, a clear silicone-polyester resin, a yellow iron oxide, and a yellow anthraquinone.

BEST MODE FOR CARRYING OUT THE INVENTION

Figure 1:
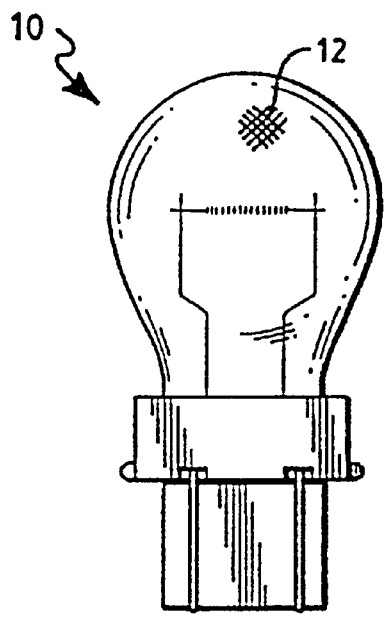
FIG. 1 shows a perspective view of a preferred embodiment of an amber vehicle lamp.
Figure 2:
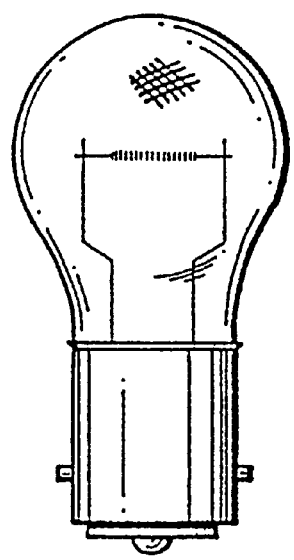
FIG. 2 shows a perspective view of a preferred alternative embodiment of an amber vehicle lamp.
Figure 3:
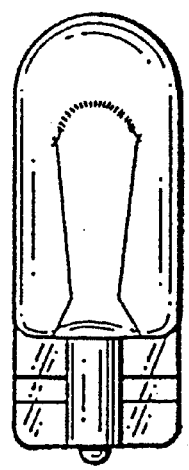
FIG. 3 shows a perspective view of another preferred alternative embodiment of an amber vehicle lamp.
Figure 4:
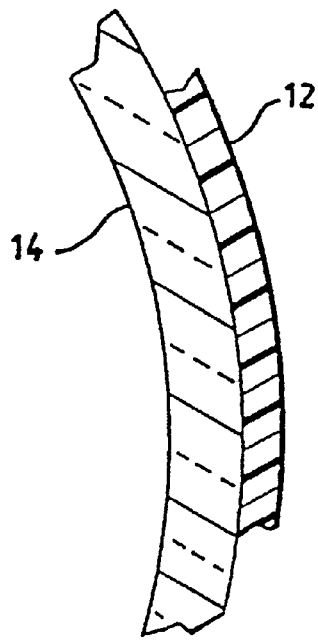
FIG. 4 shows a cross sectional view of a coated lamp envelope, partially broken away.

FIG. 1 shows a perspective view of a preferred embodiment of an amber vehicle lamp. Like reference numbers designate like or corresponding parts throughout the drawings and specification. The amber vehicle lamp 10 is assembled from a lamp bulb with a coating 12 comprising a clear silicone-polyester resin, yellow iron oxide, and a yellow anthraquinone. A silane coupling agent may be optionally included in the polyester resin. FIG. 2 shows a perspective view of a preferred alternative embodiment of an amber vehicle lamp. FIG. 3 shows a perspective view of another preferred alternative embodiment of an amber vehicle lamp. FIG. 4 shows a cross sectional view of a coated lamp envelope, partially broken away. The amber coating 12 covers substantially all of the light transmitting region of the glass 14 of the bulb.

The preferred incandescent light bulb is an spherical bulb with a press seal known generally in the industry as an S-8. The bulb has a diameter of about 1 inch, and is made of a SG10 type glass, but other glasses, including unleaded glasses, may be used. The filament is supplied with electricity through two leads sealed through the press seal. Similar, two filament, four lead bulbs are also commonly made, and may be similarly coated. A base is attached to the press seal region to provide a convenient mechanical coupling and electrical connection for the bulb. Several base designs are known. The particular choice of the base design is felt to be matter of design choice.

Coated on the exterior of the bulb is an amber colored coating 12 that, apart from the amber color is substantially transparent. The amber color coating includes a clear silicone-polyester polymer and colorant combination including yellow iron oxide, and yellow anthraquinone. The preferred coating has a weight ratio composition of 5.0 percent yellow iron oxide, 5.0 percent yellow anthraquinone with the remainder being the silicone-polyester resin. Optionally, a silane coupling agent, of 0.5 weight percent silane may be included in the silicone-polyester.

The preferred clear resin is a high silicone content polymer, and in particular, high silicone silicone-polyester type polymer resin. The Applicants use a high silicone content polymer available as SILIKOFTAL HTT from Tego Chemie Service GmbH.

The preferred silane material (optional) includes silicone-polyester linkages. The Applicants have used a known silane with polyester linkages comprising gamma-methacryloxypropyltrimethoxysilane available as Z-6030 from Dow Corning Corporation. The silane material may be applied separately, or mixed with the silicone-polyester resin. One recent test procedure indicates that while the coating composition that includes the silane material can achieve an existing specification, the same composition without the silane results in greater durability. The composition with the silane included is now considered a less preferred alternative.

A solvent is mixed with the colorants, silane (optional) and resin in sufficient quantity to form a fluid coating material with a viscosity convenient for the chosen form of application. Dipping the lamp is one convenient method of applying the coating. The Applicants prefer spraying, so the mixture needs to be diluted with the solvent sufficiently to result in a sprayable fluid. The preferred polymer solvent is acetone but others may be used, such as methoxypropylacetate.

The preferred colorant material is a mixture of a yellow iron oxide and an anthraquinone. The preferred anthraquinone is FILESTER yellow RNB, available from Ciba Specialty Chemicals and has a more particular chemical formula of 9,10-anthraceneedione,1,1'-{(6-phenyl-1,3,5- triazine-2,4diyl)diimino}bis-. The colorants are prepared to provide particle sizes of 0.01 µm or less. The very small size particle size enables a transparent bulb, that still has an amber color.

The yellow iron oxide colorant may be dispersed in a media mill using solvent, and milled to the small size. The anthraquinionie may be dispersed separately, again using a media mill, and milled to the small size (particle sizes of 0.01 µm or less). The two colorants are then combined in the mill, and then milled together. The two colorants are then thoroughly mixed. The silane (optional) and silicone-polyester resin are then added by using a planetary mixer. A solvent is added to achieve the desired viscosity for the chosen form of application. The resulting mixture, immediately after mixing, does not necessarily show the proper amber color. Nonetheless, the resulting mixture is ready for application to the clean glass lamp surface.

The Applicants coat previously manufactured, clear lamp bulbs. The chosen bulb is known as a 3157 S-8 wedge. The bulbs are held by their bases so the bulb portions face down, and the bases and electrical connections are shielded from any spray. This leaves the light transmissive portion of the bulb exposed. The exposed glass portions of the bulb are then sprayed, bulb side up, with the coating mixture at ambient temperature, leaving a thin fluid coating. Alternatively, the exposed glass portions may be dipped (bulb down) in the coating material, and any excess coating material may drip off. In either case, the viscosity is such that the coating material as applied leaves a uniform thin layer which may be approximately 0.0127 millimeters (5.0 $10^{-4}$ inches). Measured variations were about 0.0015 millimeters (5.9 $10^{-5}$ inches). This thickness is sufficient to allow light to exit the bulb with an amber color that meets the ECE specification for vehicle amber signal lamps.

The coated bulb is then baked at 250 to 300 degrees Celsius for 15 minutes in a dust free atmosphere to form an amber colored polymer layer. During the baking process a number of events occur. The colored coating layer is bonded to the glass. The yellow iron oxide changes from FeOOH to $Fe_2O_3$ and which in combination with the yellow anthraquinone pigment gives the desired amber color. The silicone-polyester polymer is cross linked around the colorant particles to entrap them in a complex network of resin material. The baking also drives off any residual solvent.

The resulting coated bulbs were tested and found to have the following characteristics: The bulb had a thin hard, transparent amber coating. The amber color meets the SAE and ECE color coordinate requirements for vehicle amber signal lamps. In particular, when the bulb is on, it produces an amber color light with color coordinates (X,Y) within the 1931 CIE chromaticity region wherein a) 0.398 (the red boundary) is equal to or less than Y, b) Y is also equal to or less than 0.429 (the green boundary), and c) 0.893—X is equal to or less than Y (the white boundary). Coated bulbs (with silane) under test have been operated continuously for over 840 hours. This is 70 percent of the rated life of 1200 hours for a 3157 S-8 wedge bulb. Coated bulbs (with silane) have been found to have complete coating adherence and a color maintenance of 96 percent measured by spherical integration methods. Coated bulbs (with silane) are expected to have a color maintenance of 94.3 percent at 100 percent of rated bulb life.

Figure 5:
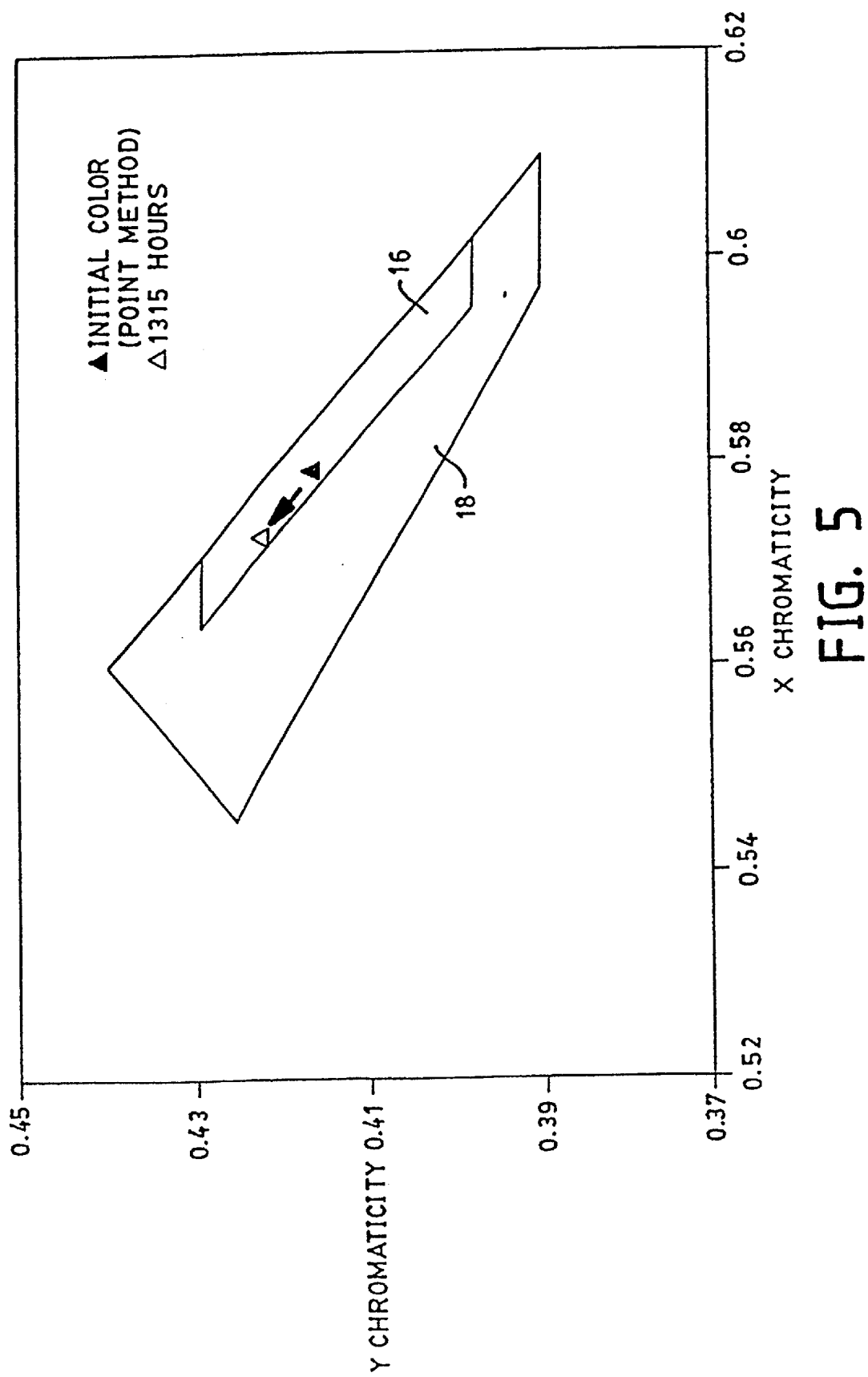
FIG. 5 shows a chart of the effects over time of fading on the color coordinates.

FIG. 5 shows a chart of the effects over time of fading on the color coordinates. In this test, the bulbs were exposed to normal operating environment of 90 flashes per second for 1315 hours. The intial color coordinates were approximately, (0.579, 0.415), and after 1315 hours the color had shifted to approximately (0.573, 0.422). Both the initial and the final coordinates were within the EC (region 16) and SAE (region 18) defined regions for amber. The coated bulbs, with silane and without silane, were tested according to a schedule of 24 hours of the lamp being on under varying conditions of heat, and humidity. In summary, during the test, the temperature was varied from −40 to 80 degrees Celsius, with the humidity reaching as much as 93 percent. Meanwhile, the lamps were turned on and off according to a schedule. The coated lamps were to achieve a BIO (90 percent success, 10 percent failure) of 10 cycles (10 days). The bulbs with silane passed with a BIO of about 10 or 12 cycles. The bulbs without the silane achieved a BIO of 18 cycles. The coated bulb has proven to have a better amber color, and a longer color maintenance than any other coated product known to the applicants. The disclosed operating conditions, dimensions, configurations and embodiments are as examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claim is:

1. An amber color coated incandescent light bulb comprising:
an incandescent light bulb with a light transmissive glass envelope, the envelope coated with an amber color coating including a clear silicone-polyester polymer and colorant including red iron oxide, and yellow anthraquinone.

2. The light bulb in claim 1, further including a silane coupling agent converted to silicon dioxide.

3. The light bulb in claim 1, wherein the color has an amber color within the 1931 CIE chromaticity region defined by 0.398=<y=<0.429 and 0.993−x=<y.

4. The light bulb in claim 2, wherein the silane includes gamma-methacryloxypropyltrimethoxysilane.

5. The light bulb in claim 1, wherein the anthraquinone has a chemical formula of 9,10-anthraceneedione, 1,1'-{(6-phenyl-1,3,5-triazine-2,4diyl)diimino}bis.

6. The light bulb in claim 1, wherein the red iron oxide has a particle size less than 0.01 µm.

7. The light bulb in claim 1, wherein the yellow anthraquinone has a particle size less than 0.01 µm.

8. An amber color coated incandescent light bulb comprising:
an incandescent light bulb with a light transmissive glass envelope,
an amber color coating including a clear polysiloxane polyester resin and colorant including red iron oxide having a particle size less than 0.01 µm, and a yellow anthraquinone having a chemical formula of 9,10-anthraceneedione, 1,1'-{(6-phenyl-1,3,5-triazine-2,4diyl)diimino}bis- also with a particle size less than 0.01 µm in a film having a weight composition 5.0 percent yellow iron oxide converted to red iron oxide, 5.0 percent yellow anthraquinone and the remainder being resin.

9. The light bulb in claim 8, further including a silane coupling agent including gamma-methacryloxypropyltrimethoxysilane comprising 0.5 percent of the composition.

10. A method of making an amber coated lamp bulb comprising the steps of:

a) providing a lamp bulb with a glass region to be coated;

b) providing a mixture of a yellow iron oxide, and a yellow anthraquinone, the mixture having an average particle size sufficiently small to result in a clear colored coating;

c) mixing the yellow iron oxide, and yellow anthraquinone mixture with a clear silicone-polyester resin;

d) further including in the mixture a polymer solvent being in sufficient quantity to form a fluid coating material with a viscosity convenient for application;

e) coating the glass region to be coated with the coating material to a thickness sufficient to allow passage of light out from the lamp bulb; and f) heating the coated lamp to a sufficient temperature, and for a sufficient time period to cure the resin, to substantially remove the solvent and to form a colored polymer layer on the lamp.

11. The method in claim 10 wherein the polymer solvent includes acetone in sufficient quantity to form a fluid coating material with a viscosity convenient for spraying.

12. The method in claim 10 wherein the coating material is sprayed on the glass region to be coated.

13. The method in claim 10 wherein the with the coating material is applied to a uniform thickness of 0.0127 millimeters (0.0005 inches).

14. The method in claim 10 wherein the lamp is heated from 250 to 300 degrees Celsius for 15 minutes in a dust free atmosphere.

15. A method of making an amber coated lamp bulb comprising the steps of:

a) providing a lamp bulb with a glass region to be coated;

b) providing a mixture of equal weight amounts of yellow iron oxide, and a yellow anthraquinone having a chemical formula of 9,10-anthracenedione,1,1'-{(6-phenyl-1,3,5-triazine-2,4diyl)diimino}bis-, the mixture having an average particle size of no more than 0.01 $\mu$m;

c) mixing the yellow iron oxide, and yellow anthraquinone mixture with a silane, being gamma-methacryloxypropyltrimethoxysilane, and a clear silicone-polyester resin to form a coating material, with a weight composition of 0.5 percent silane, 5.0 percent yellow iron oxide, 5.0 percent yellow anthraquinone, and the remaining weight being the silicone-polyester resin;

d) further including in the mixture a polymer solvent being acetone in sufficient quantity to form a fluid coating material with a viscosity convenient for spraying;

e) spraying the glass region to be coated with the coating material to a uniform thickness of 0.0127 millimeters (0.0005 inches); and f) heating the sprayed lamp from 250 to 300 degrees Celsius for 15 minutes in a dust free atmosphere to cure the resin, to substantially remove the solvent and to form a colored polymer layer on the lamp.

\* \* \* \* \*